United States Patent
Chen et al.

(10) Patent No.: US 11,544,197 B2
(45) Date of Patent: Jan. 3, 2023

(54) RANDOM-ACCESS PERFORMANCE FOR PERSISTENT MEMORY

(71) Applicant: Alibaba Group Holding Limited, Grand Cayman (KY)

(72) Inventors: Shuo Chen, Bellevue, WA (US); Zhu Pang, Bellvue, WA (US); Qingda Lu, Bellevue, WA (US); Jiesheng Wu, Redmond, WA (US); Yuanjiang Ni, Santa Cruz, CA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/025,589

(22) Filed: Sep. 18, 2020

(65) Prior Publication Data
US 2022/0091989 A1 Mar. 24, 2022

(51) Int. Cl.
G06F 12/08 (2016.01)
G06F 12/0888 (2016.01)

(52) U.S. Cl.
CPC .... *G06F 12/0888* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 6,513,100 B1* | 1/2003 | Clift | G06F 12/0261 711/E12.01 |
| 7,856,530 B1* | 12/2010 | Mu | G06F 12/0888 711/119 |
| 8,806,115 B1 | 8/2014 | Patel et al. | |
| 8,898,388 B1 | 11/2014 | Kimmel | |
| 9,384,134 B2 | 7/2016 | Rudelic et al. | |
| 9,880,744 B1* | 1/2018 | Dalal | G06F 3/0688 |
| 10,191,822 B2 | 1/2019 | Ware et al. | |
| 10,216,637 B2 | 2/2019 | Ergan et al. | |
| 10,379,954 B2 | 8/2019 | Shu et al. | |
| 10,719,236 B2 | 7/2020 | Hansson et al. | |
| 10,817,421 B2 | 10/2020 | Talagala et al. | |
| 10,817,502 B2 | 10/2020 | Talagala et al. | |
| 2003/0212865 A1* | 11/2003 | Hicken | G06F 12/0804 711/E12.04 |

(Continued)

*Primary Examiner* — Tracy C Chan
(74) *Attorney, Agent, or Firm* — Lee & Hayes, P.C.

(57) ABSTRACT

A mapping correspondence between memory addresses and request counts and a cache line flusher are provided, enabling selective cache flushing for persistent memory in a computing system to optimize write performance thereof. Random writes from cache memory to persistent memory are prevented from magnifying inherent phenomena of write amplification, enabling computing systems to implement persistent memory as random-access memory, at least in part. Conventional cache replacement policies may remain implemented in a computing system, but may be effectively overridden by operations of a cache line flusher according to example embodiments of the present disclosure preventing conventional cache replacement policies from being triggered. Implementations of the present disclosure may avoid becoming part of the critical path of a set of computer-executable instructions being executed by a client of cache memory, minimizing additional computation overhead in the critical path.

20 Claims, 4 Drawing Sheets

(56) References Cited

U.S. PATENT DOCUMENTS

| | | | |
|---|---|---|---|
| 2009/0249349 A1* | 10/2009 | Bose | G06F 9/4893 718/103 |
| 2011/0055489 A1* | 3/2011 | Reddy | G06F 12/0831 711/E12.017 |
| 2011/0093654 A1* | 4/2011 | Roberts | G06F 12/121 711/105 |
| 2013/0024628 A1* | 1/2013 | Benhase | G06F 12/0891 711/144 |
| 2017/0147208 A1* | 5/2017 | Shu | G06F 16/11 |
| 2020/0026582 A1* | 1/2020 | Shveidel | G06F 3/0656 |
| 2020/0363956 A1 | 11/2020 | Frank et al. | |

* cited by examiner

RANDOM-ACCESS PERFORMANCE FOR PERSISTENT MEMORY

BACKGROUND

In computing, data is stored in a range of storage devices, which trade off factors such as read and write speed and storage capacity against each other. Volatility of storage, being tied to read and write speed, storage capacity, and the like due to the implementations of various computer-readable storage media, is another factor that is traded off as a result.

In hardware, computing systems generally include a variety of volatile and non-volatile storage media, where volatile storage media tends to be faster in performance measures such as read and write speed, while non-volatile storage media tends to be slower in performance measures. For example, various forms of random-access memory ("RAM"), as volatile storage media, provide fast read and write access but lose data quickly upon loss of power. Magnetic storage drives, flash memory such as solid state drives, and read-only memory ("ROM"), as non-volatile storage media, may store data through power loss. These and other different forms of computer-readable storage media are generally organized in a hierarchy wherein faster read and write speeds, smaller storage capacity, and greater volatility are associated together, and likewise slower read and write speeds, larger storage capacity, and non-volatility are associated together.

In contrast, persistent memory is a new design for storage media in computing devices seeking to provide advantages that current hardware does not. Persistent memory may be both random access and non-volatile: persistent memory technologies may be designed to achieve both the rapid random access of conventional RANI and the persistence of data through power cycling. This distinguishes persistent memory from dynamic random-access memory ("DRAM"), which generally makes up the primary memory of a computing system, providing the fastest read and write access out of all storage media of the computing system.

In contrast, persistent memory generally exhibits asymmetry in random accesses, supporting fast read operations but slow write operations. Consequently, the use of persistent memory in a computing system should be conceptualized to maximize the strengths of this type of storage media and minimize its weaknesses.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing a cache flusher, and more specifically implementing selective cache flushing for persistent memory in a computing system to optimize write performance thereof.

Figure 1:
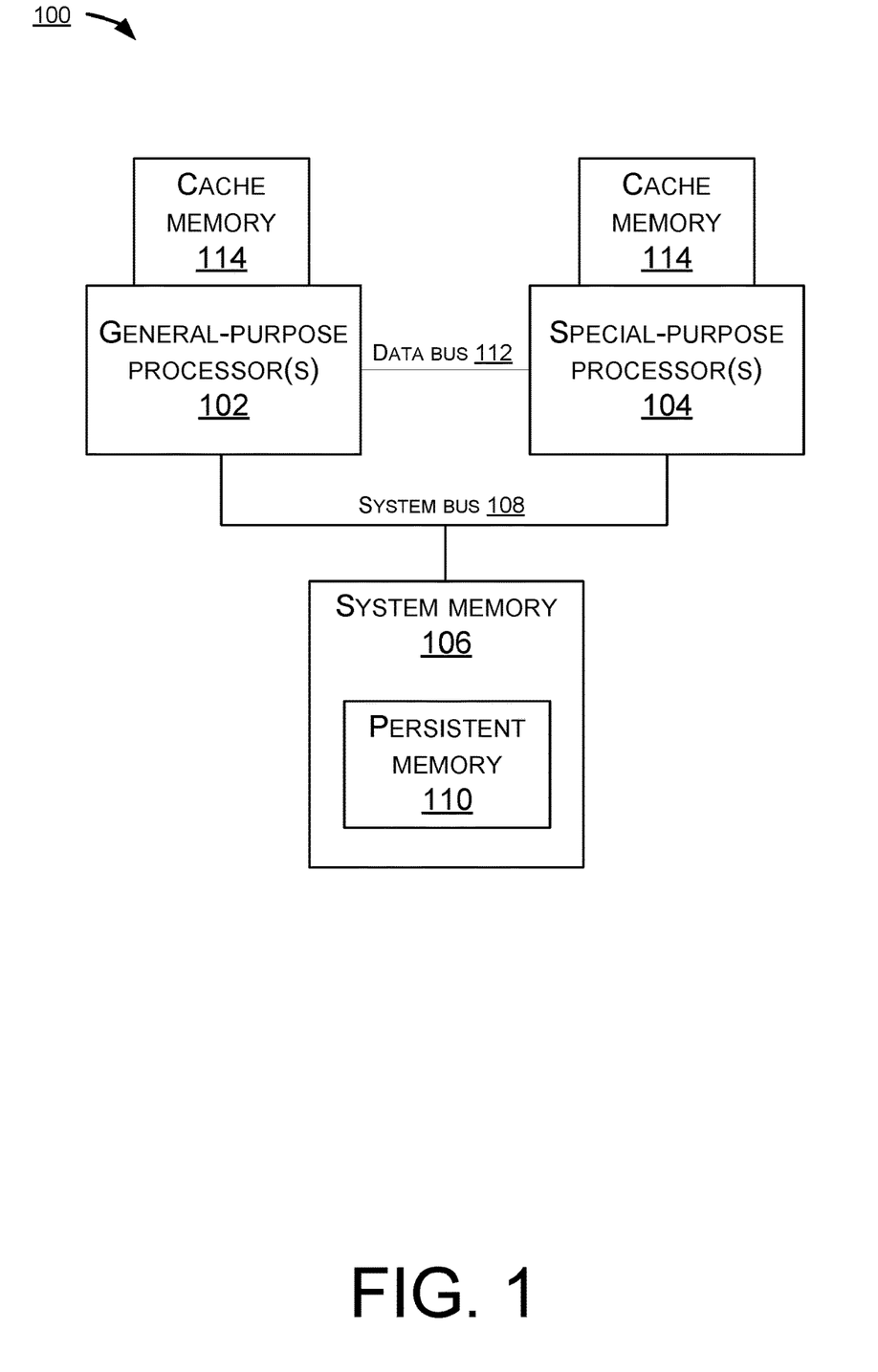
FIG. 1 illustrates a system architecture of a system configured for any general-purpose or special-purpose computations according to example embodiments of the present disclosure.

FIG. 1 illustrates a system architecture of a system 100 configured for any general-purpose or special-purpose computations according to example embodiments of the present disclosure.

A system 100 according to example embodiments of the present disclosure may include one or more general-purpose processor(s) 102 and may further include one or more special-purpose processor(s) 104. The general-purpose processor(s) 102 and special-purpose processor(s) 104 may be physical or may be virtualized and/or distributed. The general-purpose processor(s) 102 and special-purpose processor(s) 104 may execute one or more instructions stored on a computer-readable storage medium as described below to cause the general-purpose processor(s) 102 or special-purpose processor(s) 104 to perform a variety of functions. General-purpose processor(s) 102 may be computing devices configurable by sets of computer-executable instructions to perform a variety of functions, such as a central processing unit ("CPU"). Special-purpose processor(s) 104 may be computing devices having hardware or software elements facilitating computation of specialized mathematical computing tasks. For example, special-purpose processor(s) 104 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate specialized computation, special-purpose processor(s) 104 may, for example, implement engines operative to compute mathematical operations (such as, matrix operations and vector operations).

A system 100 may further include a system memory 106 communicatively coupled to the general-purpose processor(s) 102, and to the special-purpose processor(s) 104 where applicable, by a system bus 108. The system memory 106 may be physical or may be virtualized and/or distributed. Depending on the exact configuration and type of the system 100, the system memory 106 may be volatile, such as RAM, non-volatile, such as ROM, flash memory, miniature hard drive, memory card, and the like, or some combination thereof.

According to example embodiments of the present disclosure, the system memory 106 may further include persistent memory 110. Persistent memory 110 may generally be implemented as various forms of non-volatile memory ("NVM") or non-volatile random-access memory ("NVRAM") which supports byte-addressable random access to data stored thereon. A variety of otherwise heterogeneous semiconductor implementations of computer-readable storage media each have such qualities of persistent memory 110 as described above, such as phase-change memory ("PCM"), resistive random-access memory ("ReRAM"), magnetoresistive random-access memory ("MRAM"), non-volatile dual in-line memory modules ("NVDIMM"), and the like.

However, though each such semiconductor technology may implement persistent memory 110 according to example embodiments of the present disclosure, the concept of persistent memory is not limited to the physical capacities of NVM or NVRAM as described above. The concept of persistent memory may further encompass functionality as both short-term storage and long-term storage, as persistent memory may, beyond implementing conventional memory addressing, additionally implement a file system establishing a structure for storage and retrieval of data in the form of individual files.

The system bus 108 may transport data between the general-purpose processor(s) 102 and the system memory 106, between the special-purpose processor(s) 104 and the system memory 106, and between the general-purpose processor(s) 102 and the special-purpose processor(s) 104. Furthermore, a data bus 112 may transport data between the general-purpose processor(s) 102 and the special-purpose processor(s) 104. The system bus 108 and/or the data bus 112 may, for example, be Peripheral Component Interconnect Express ("PCIe") interfaces, Coherent Accelerator Processor Interface ("CAPI") interfaces, Compute Express Link ("CXL") interfaces, Gen-Z interfaces, RapidIO interfaces, and the like. As known to persons skilled in the art, some such interfaces may be suitable as interfaces between processors and other processors; some such interfaces may be suitable as interfaces between processors and memory; and some such interfaces may be suitable as interfaces between processors and persistent memory.

In practice, various implementations of persistent memory tend to exhibit certain advantages and disadvantages of random-access memory, as well as certain advantages and disadvantages of non-volatile storage media. For example, while implementations of persistent memory may permit fast random-access reads of data, random-access writes of data may exhibit greater latency, especially with respect to operations such as inserts and deletes in indexed data structures, such as lists and arrays, which support such operations. This may result from the access granularity of various persistent memory implementations: while memory random-access is byte-addressable, persistent memory implementations based on flash memory (such as, for example, NVDIMM) may only be able to write data upon erasing data blocks of fixed size, resulting in the phenomenon of write amplification as known in the art, wherein write accesses of size smaller than the access granularity of the underlying flash memory lead to a cascade of moving and rewriting operations which substantially increase write latency. This phenomenon may be particularly exacerbated in the case of random access, such as inserts, deletes, and the like.

However, as the majority of existing computing systems implement system memory primarily in the form of random-access memory, the design and architecture of physical and/or virtual hardware of many computing systems as well as the design and implementation of applications executable by these computing systems are generally optimized based on performance characteristics of random-access memory—that is, fast random-access reads and writes to any specified memory address therein.

In contrast, the design and architecture of computing systems incorporating persistent memory, and implementation of applications executable by those computing systems, may be optimized based on the expectation that some unavoidable write amplification will take place as a consequence of writing to persistent memory. There are generally no mechanisms known to persons skilled in the art for entirely eliminating write amplification from a computing system incorporating persistent memory.

In order to more closely incorporate persistent memory into existing computing systems, and in order to design new computing system architectures which include persistent memory, it is desirable for persistent memory to, at least in part, fulfill random-access memory requirements of the computing systems. In accordance with this objective, it is desired to enable persistent memory to perform random-access writes without incurring substantial degradations in performance. Due to phenomena native to persistent memory as described above, such as write amplification, persistent memory incorporated into computing systems generally cannot inherently fulfill such a requirement. Moreover, as the specific underlying implementations of random-access memory may be hidden by operating system ("OS") abstraction layers, computer-executable applications generally cannot be optimized for heterogeneous types of random-access memory having different performance characteristics based on existing operating system abstractions and OS application programming interfaces ("APIs").

It is possible to use existing ISA calls, such as memory fence instructions (e.g., the MFENCE and SFENCE instructions as supported by the x86 ISA, to facilitate sequential writes to temporarily bar read and/or write access to at least part of system memory so that sequentiality of pending writes may be enforced. However, calls to such instructions by a processor generally cause the processor to delay execution of other instructions until the memory fence barrier is no longer in effect, leading to decreases in performance.

According to example embodiments of the present disclosure, rather than expose computer-executable applications to heterogeneous types of memory architecture, the incorporation of both conventional random-access memory and persistent memory used in the capacity of random-access memory may remain hidden from applications. Instead, example embodiments of the present disclosure may be implemented at the OS level to reduce discrepancy between performance of random writes on random-access memory and performance of random writes on persistent memory, complementing existing OS hardware abstractions.

In general, a cache memory 114 is a component of system memory of a computer system, such as a system 100 as described above with reference to FIG. 1. A cache memory 114 is generally a memory implemented to have faster read and write speed than the remainder of the system memory of a computing system. A cache memory 114 is commonly implemented as a processor cache, a memory having physical locality near one or more core(s) of any of a general-purpose processor or a special-purpose processor as described above with reference to FIG. 1. Thus, a processor cache may be any of a CPU cache, a GPU cache, and the like which may be implemented at a processor as known to persons skilled in the art. A processor cache may be implemented having multiple hierarchical levels, where a smallest level of a processor cache may have fastest read and write speeds among the levels and a largest level of a processor cache may have slowest read and write speeds among the levels.

A cache memory 114 may temporarily store data copied from the system memory (which may be referred to as a "backing store" in this context) on a temporary basis to satisfy read and write requests to particular memory addresses which are likely to be made repeatedly by a cache client, such as one or more processor(s), computer-executable applications, an OS, and the like. Data stored at a cache memory 114 must therefore be ultimately copied back to the backing store. Since data stored at a cache memory 114 may originally be copied thereto from randomly accessed memory addresses (according to various cache replacement policies as known to persons skilled in the art, details of which need not be discussed herein for understanding example embodiments of the present disclosure), after data is written to (causing data which has become desynchronized from the backing store copy to be labeled as "dirty" data), the dirty data must also ultimately be synchronized back to addresses in the backing store and cleared from the cache memory 114 in the process (in an operation referred to as a "flush"), resulting in random writes copying data from the cache memory 114 to the backing store.

Such operations may be implemented in instruction set architecture ("ISA") calls supported by a processor architecture of a computing system. For example, the x86 ISA supports instructions such as CLWB and CLFLUSHOPT to cause operations such as write-backs and flushing.

Cache memory 114 may be, for example, a write-back cache, wherein writes to the cache are not immediately synchronized to the backing store, or a write-through cache, wherein writes to the cache are immediately synchronized to the backing store. According to example embodiments of the present disclosure, a cache memory 114 may be a write-back cache. Thus, at any given time the cache memory 114 may have queued some number of pending writes to the backing store, and, depending on implementation-specific design choices, queued writes may not be flushed until cache memory fills.

In the event that at least part of the backing store of a cache is implemented on persistent memory, at least some of these queued writes may target memory addresses of the persistent memory. In the event that such queued writes are performed in an arbitrary order or in a queued order (which may cause even writes which were performed sequentially to become effectively arbitrary in order), the random-access writes which result may cause substantial write amplification as described above.

Thus, example embodiments of the present disclosure provide improved performance of random writes from cache memory 114 to persistent memory, by implementing at least a cache index and selective cache line flushing.

Figure 2:
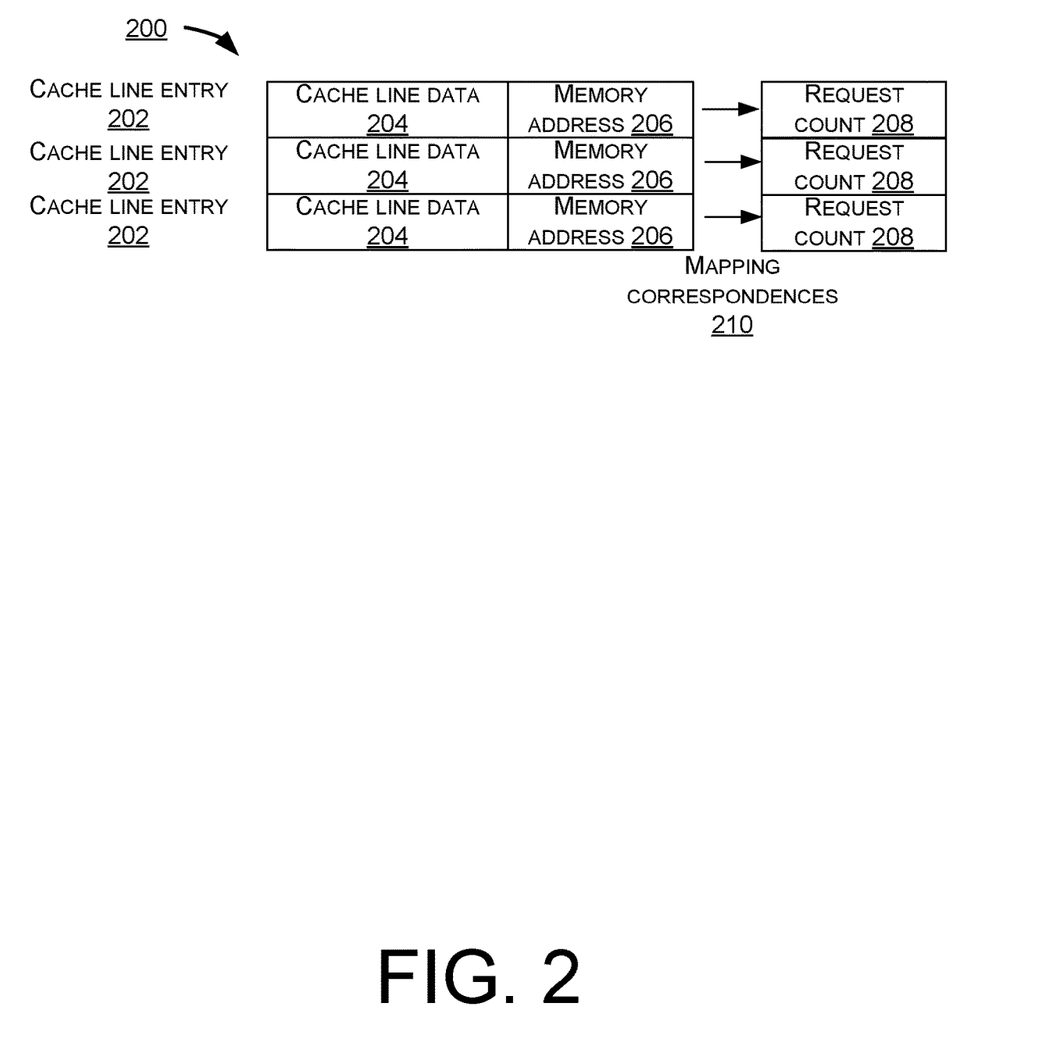
FIG. 2 illustrates a diagram of a data structure recording cache lines of a cache memory and a mapping correspondence between memory addresses and request counts according to example embodiments of the present disclosure.

FIG. 2 illustrates a diagram of a data structure 200 recording cache lines of a cache memory and a mapping correspondence between memory addresses and request counts according to example embodiments of the present disclosure. The data structure 200 may be stored in a cache memory of a processor of a computing system according to example embodiments of the present disclosure. For each processor having its own cache memory, a data structure 200 may be stored in a corresponding cache memory.

Cache lines refer to units of data which are copied from a backing store to a cache memory. Upon the data being copied to the cache memory, a cache line entry 202 may be recorded in a data structure 200. The data structure 200 may be an indexed data structure which may record any number of elements which allows any element therein to be looked up by a key which indexes each element, where the key may be sorted or unsorted. For example, an indexed data structure may be an array, a table, a plurality of vectors or matrix, and the like. Alternatively, the data structure 200 may be a sequential data structure, which may be any data structure as known to persons skilled in the art which may record any number of sequential elements which may only be traversed in order. For example, a sequential data structure may be a linked list, a circular buffer, and other such data structures.

According to example embodiments of the present disclosure, a cache line entry 202 may include at least cache line data 204, where "cache line data" is used herein to distinguish data which was copied from the backing store to the cache memory from other data in general. A cache line entry 202 may further include a memory address 206 of the backing store from which the cache line data 204 was copied.

A memory address 206 may further be mapped to a request count 208, which may be a numerical value tracking a number of times that a client (such as one or more processor(s), computer-executable applications, an OS, and the like) of the cache memory requested to read from or write to the memory address 206. The mapping between the memory address 206 and the request count 208 may be by a mapping correspondence 210. A mapping correspondence 210 may be any suitable data structure as known to persons skilled in the art which may record one-to-one correspondences between first elements (such as a memory address 206) and second elements (such as a request count 208). For example, a mapping correspondence 210 may be a key-value store, a dictionary, a hash table, a hash map, or any such related data structures as known to persons skilled in the art.

The mapping correspondence 210 may be part of the data structure 200, or may be separate from the data structure 200. In either regard, for the purpose of example embodiments of the present disclosure, the mapping correspondence only needs to map memory addresses 206 and request counts 208, and may further map memory addresses 206 to cache line entries 202 or cache line data 204.

A client of the cache memory may run one or more threads executing one or more sets of computer-executable instructions on a processor (for example, a processor which utilizes the cache memory as its processor cache), where a thread may execute at least one sequential set of instructions, wherein each instruction is executed dependent on previous instructions and cannot be executed concurrent to any previous instructions. For the purpose of understanding example embodiments of the present disclosure, this sequential set of instructions, which may be all or may be a subset of the entirety of a set of computer-executable instructions (that is, the instructions may or may not include other instructions which may be executed concurrently), shall be referred to as a "critical path" of the set of computer-executable instructions. Each thread may execute a respective critical path of instructions. A processor having multiple cores may execute multiple such threads concurrently.

During execution of a set of computer-executable instructions, whenever the execution thereof causes the client to make one or more read and/or write request(s) corresponding to a requested memory address of a system memory, a processor of the computing system (for example, a processor which utilizes the cache memory as its processor cache) may trace whether the requested memory address is mapped to any cache line entry 202 (the mapping of which may be found in the data structure 200 rather than the mapping association 210), by processes as known to persons skilled in the art (which need not be further detailed herein for understanding of example embodiments of the present disclosure). For the purpose of example embodiments of the present disclosure, such traces may be referred to as "read traces," "write traces," or "update traces" in general.

A positive result is generally referred to as a "cache hit," whereupon the request may be performed at copied data stored at the cache memory in processes as known to persons skilled in the art (which need not be further detailed herein for understanding of example embodiments of the present disclosure), and a negative result is generally referred to as a "cache miss," whereupon the request may be performed at the original data stored at the backing store.

Upon a cache hit, the client may access one or more cache lines identified by cache line entries to which the requested memory address is mapped (the mapping of which may be found in the data structure 200 rather than the mapping association 210) to perform one or more read and/or write operation(s). The operation of accessing one or more cache lines may become part of the critical path of a set of computer-executable instructions being executed by the client.

According to example embodiments of the present disclosure, elements of a data structure 200, including at least request counts 208 of the data structure 200, may be updated on a maintained basis or may be tracked on an ad-hoc basis. According to example embodiments wherein elements are updated on a maintained basis, upon a cache hit, request counts to the requested memory address may be incremented. However, the incrementing consequently also become part of the critical path of a set of computer-executable instructions being executed by the client. The addition of operations to the critical path may introduce additional computational overhead which slows subsequent operations in the critical path.

According to example embodiments wherein elements are updated on an ad-hoc basis, each cache line access resulting from a cache hit may be stored in memory, and upon wakeup of a cache line flusher thread, and/or upon other predetermined or dynamically determined times (which shall be described subsequently), accesses corresponding to each cache line entry may be tallied and a request count of each cache line entry may be incremented based on a tally of accesses. Herein, the incrementing does not become part of the critical path of a set of computer-executable instructions being executed by the client, and the ad-hoc updating of elements may avoid additional computation overhead in the critical path.

Furthermore, overall, the cache line flusher thread running in a background thread may avoid the flushing operations (as shall be described subsequently) being executed in the critical path, avoiding additional computation overhead in the critical path. While, to some extent, the cache line flusher thread may still add to computational overhead in the computing system overall, performance is not unduly impacted as the speed of writing to persistent memory, being slower than the speed of writing to DRAM, may create a bottleneck for the rate of cache line flushing and thus prevent excessive computation by the cache line flusher thread.

Conventionally, cache memory implementations may record cache line entries which include some of the above information, such as the cache line data 204 and the memory address 206. Thus, in the normal operation of a cache memory according to example embodiments of the present disclosure, recording and updating of such information in cache line entries may proceed according to processes as known to persons skilled in the art. However, conventional cache line entries do not include a request count 208, and updating of request counts may proceed according to example embodiments as described herein.

Furthermore, conventional cache replacement policies may cause cache lines to be flushed to the backing store upon cache storage space being filled. However, according to example embodiments of the present disclosure, the cache line flusher may generally set wakeup times (as shall be described subsequently) effective to cause flushing to backing store before cache storage space becomes filled. Thus, according to example embodiments of the present disclosure, conventional cache replacement policies may remain implemented in a computing system, but may be effectively overridden by operations of the cache line flusher preventing conventional cache replacement policies from being triggered.

According to alternative example embodiments of the present disclosure, logic of a cache line flusher thread as described herein may be implemented directly as a cache replacement policy rather than being implemented to run in a separate cache line flusher thread.

Example embodiments of the present disclosure further provide a cache line flusher. The cache line flusher may be a set of computer-executable instructions stored on computer-readable storage medium and executable by a processor of a computing system according to example embodiments of the present disclosure. The cache line flusher may be configured to be executable by each processor having a corresponding processor cache, and to be executed by the respective processor to run the cache line flusher in a dedicated thread of the respective processor. The cache line flusher may further be configured to be run by a processor in a background state, such that it does not block execution of a critical path at any thread being run by the processor.

The cache line flusher may further be configured to be run by a processor in a thread which sleeps until a wakeup time occurs. During each wakeup, the cache line flusher may dynamically configure a next wakeup time, as shall be subsequently described. Thus, consecutive wakeup times may occur periodically or may occur non-periodically.

Figure 3:
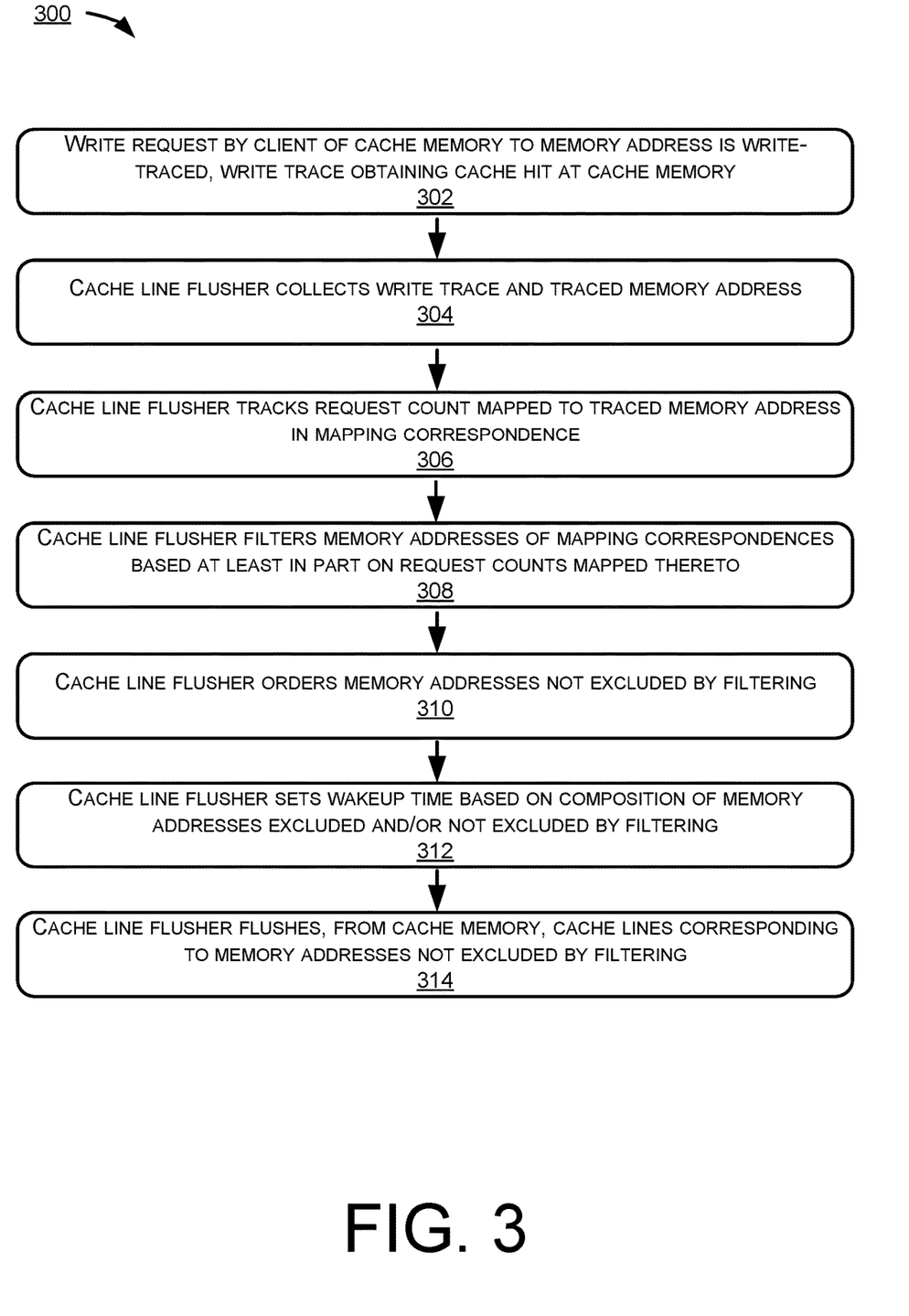
FIG. 3 illustrates a flowchart of a cache line flushing method according to example embodiments of the present disclosure.

FIG. 3 illustrates a flowchart of a cache line flushing method 300 according to example embodiments of the present disclosure. The cache line flushing method 300 may be described with reference to the data structure 200 as described above.

At a step 302, a write request by a client of a cache memory to a memory address is write-traced, the write trace obtaining a cache hit at the cache memory.

As described above, the cache memory may be a processor cache of a processor of a computing system, and the cache memory may be one of multiple cache memories, each being a processor cache of a different processor of the computing system. As described above, a client of a cache memory may be a processor of the computing system, a computer-executable application being executed in one or more threads of a processor of the computing system, an OS running on the computing system, and the like.

At a step 304, a cache line flusher collects the write trace and the traced memory address.

As described above, a cache line flusher may run in a background thread and may sleep until a wakeup time occurring. However, the cache line flusher may collect the write trace and the traced memory address during sleep. For example, a helper function of the cache line flusher may configure the client of the cache memory to perform collection without the cache line flusher waking.

As described above, tracing the write request may refer to checking whether the traced memory address of the write request is mapped to any cache line entry. However, the cache line flusher need not determine the cache line entry to which the write request is mapped. Rather, the cache line flusher may merely collect the write trace for the purpose of incrementing a request count of the traced memory address, or batch incrementing multiple request counts of respective traced memory address, as shall be subsequently described with reference to step 306.

At a step 306, a request count mapped to the traced memory address is tracked in a mapping correspondence.

A request count of a traced memory address may be incremented, or multiple request counts of respective traced memory addresses may be may batch incremented. In the case of incrementing a request count and in the case of batch incrementing multiple request counts, the request counts may be incremented upon wakeup of a cache line flusher thread from sleep (i.e., when the cache liner flusher needs to refer to the most current request counts for the purpose of performing cache line flushing as shall be described subsequently), and/or the request counts may be incremented upon the write trace and the traced memory address being collected. To increment the request counts upon the write trace and the traced memory address being collected, a helper function of the cache line flusher may perform the incrementing while the cache line flusher thread remains in sleep.

Request counts of the mapping correspondence may be incremented by replacing an existing mapping correspondence between memory addresses and request counts with a new mapping correspondence between memory addresses and incremented request counts. Based on the traced memory address, an existing memory address, which may be identified by a pointer, may be replaced by the traced memory address, which may be identified by a new pointer. The exchange of pointers may be performed atomically. (According to database transaction guarantees as known to persons skilled in the art, such as atomicity, consistency, isolation, and durability ("ACID"), atomicity ensures that individual transactions will not be partially performed, so that a data structure being updated will not be left in a partially updated state in the event of a system failure.) In the event that request counts are batch incremented, all existing mapping correspondences may be replaced by new mapping correspondences, derived from the collected write traces and traced memory addresses.

At a step 308, the cache line flusher filters memory addresses of the mapping correspondences based at least in part on request counts mapped thereto.

Regardless of whether the cache line flusher has woken at step 306, the cache line flusher has reached a wakeup time at step 308 and is proceeding to perform cache line flushing. However, prior to flushing, the cache line flusher may filter the mapping correspondences by excluding at least some memory addresses, based on corresponding request counts from being flushed.

For example, the cache line flusher may exclude memory addresses corresponding to request counts over a predetermined threshold from being flushed. Memory addresses which are frequently subject to write requests in this manner may be considered "hot" addresses. Contrary to conventional cache replacement policies, which may mark cache lines as "dirty" upon a write thereto and may prioritize flushing of "dirty" cache lines to the backing store, example embodiments of the present disclosure may preferentially prevent dirty cache lines from being flushed to the backing store in the event that such cache lines are frequently written to.

For example, the cache line flusher may sort the mapping correspondences by memory address sequential order, identify one or more substantially contiguous ranges of memory addresses occurring amongst the mapping correspondences, and exclude memory addresses falling outside of these contiguous ranges from being flushed. As the cache line flusher is implemented to improve performance of flushes to persistent memory in particular, it is desired to preferentially perform flushes which will result in substantially sequential writes to the persistent memory, and exclude flushes which will result in random writes and thereby magnify write amplification.

At a step 310, the cache line flusher orders memory addresses not excluded by filtering.

The ordering may be performed during sorting as described above with reference to step 308. The ordering may cause the non-excluded memory addresses to be written to an ordered data structure, such as an ordered list and the like.

At a step 312, the cache line flusher sets a wakeup time based on composition of memory addresses excluded and/or not excluded by filtering.

The cache line flusher may determine a proportion of excluded memory addresses compared to a total number of memory addresses and/or a proportion of non-excluded memory addresses compared to a total number of memory addresses. The total number of memory addresses from the mapping correspondences substantially correlates to size of a number of cache lines copied from the backing store which have been written to.

A threshold proportion may be predetermined based on performance tests and metrics of example embodiments of the present disclosure, dividing a range of possible proportions of non-excluded memory addresses between a low range and a high range, or a range of possible proportions of excluded memory addresses between a high range and a low range. While a proportion of non-excluded memory addresses falls within a low range and/or a proportion of excluded memory addresses falls within a high range (meaning comparatively few cache lines will be flushed), the cache line flusher may set a new wakeup time having an interval greater than a previous wakeup time by linear increase over time. However, while a proportion of non-excluded memory addresses falls within a high range and/or a proportion of excluded memory addresses falls within a low range (meaning comparatively many cache lines will be flushed), the cache line flusher may set a new wakeup time having an interval lesser than a previous wakeup time by exponential decrease over time. Wakeup times over the exponential decrease range may ultimately fall below wakeup times over the linear increase range.

Such setting of cache line flusher wakeup times may cause the cache line flusher to avoid overutilization of computational resources at times when flushing is comparatively uncommon, and cause the cache line flusher to respond quickly to flushing requirements of the cache memory at times when flushing is comparatively common. In this manner, the cache line flusher may generally set wakeup times effective to cause flushing to backing store before cache storage space becomes filled. Thus, conventional cache replacement policies may be effectively overridden by operations of the cache line flusher preventing conventional cache replacement policies from being triggered.

At a step 314, the cache line flusher flushes, from the cache memory, cache lines corresponding to memory addresses not excluded by filtering.

The cache line flusher may iterate through the memory addresses as ordered in step 310 as described above (for example, by iterating through the ordered list as described above). In turn for each such memory address, the cache line flusher may configure a processor (for example, a processor which utilizes the cache memory as its processor cache) of the computing system to flush each such cache line, based on information stored in the data structure 200 as described above. In turn for each memory address, cache memory space corresponding to the flushed cache lines may be freed for subsequent cache lines to be copied from the backing store. In turn for each memory address, cache line data stored at the cache line may be written back to the backing store.

According to example embodiments of the present disclosure, since at least part of the backing store may be implemented as persistent memory, at least some writes as described above may be performed to persistent memory. The writes may be performed in manners as known to persons skilled in the art, and thus the writes may incur some degree of write amplification. However, write amplification may be reduced by the exclusion of memory addresses which would tend to magnify write amplification.

Furthermore, since cache replacement policies are bypassed according to example embodiments of the present disclosure, the possibility of queued writes being performed in arbitrary order, due to random replacement of cache lines with arbitrary memory addresses which may occur due to execution of cache replacement policies, is minimized.

Figure 4:
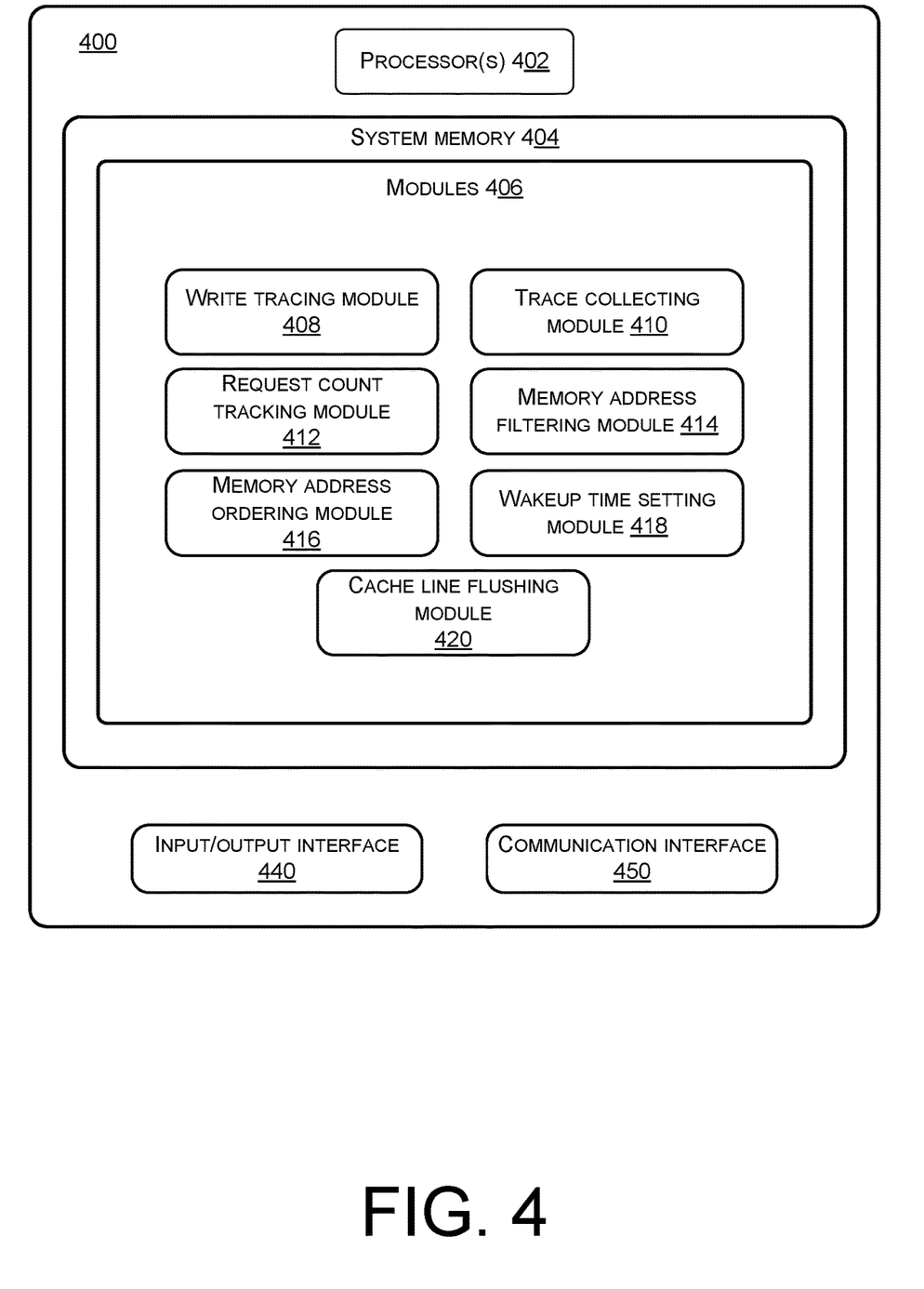
FIG. 4 illustrates an example computing system for implementing the data structures and cache line flusher described herein according to example embodiments of the present disclosure.

FIG. 4 illustrates an example computing system 400 for implementing the data structures and cache line flusher described above according to example embodiments of the present disclosure.

The techniques and mechanisms described herein may be implemented by multiple instances of the computing system 400, as well as by any other computing device, system, and/or environment. The computing system 400 may be any varieties of computing devices, such as personal computers, personal tablets, mobile devices, and other such computing devices. The computing system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 400 may include one or more processors 402 and system memory 404 communicatively coupled to the processor(s) 402. The processor(s) 402 and system memory 404 may be physical or may be virtualized and/or distributed. The processor(s) 402 may execute one or more modules and/or processes to cause the processor(s) 402 to perform a variety of functions. In embodiments, the processor(s) 402 may include a central processing unit ("CPU"), a GPU, an NPU, a TPU, any combinations thereof, or other processing units or components known in the art. Additionally, each of the processor(s) 402 may possess its own local memory, such as cache memory as described above, which also may store program modules, program data, and/or one or more operating systems.

Depending on the exact configuration and type of the computing system 400, the system memory 404 may be volatile, such as RAM, non-volatile, such as ROM, flash memory, miniature hard drive, memory card, and the like, or some combination thereof, but further includes persistent memory as described above. The system memory 404 may include one or more computer-executable modules 406 that are executable by the processor(s) 402. The modules 406 may generally be stored on system memory 404 with nearest locality to one or more processor(s) 402.

The modules 406 may include, but are not limited to, a write tracing module 408, a trace collecting module 410, a request count tracking module 412, a memory address filtering module 414, a memory address ordering module 416, a wakeup time setting module 418, and a cache line flushing module 420.

The write tracing module 408 may be configured to write-trace a write request by a client of a cache memory to a memory address as described above with reference to FIG. 3.

The trace collecting module 410 may be configured to collect the write trace and the traced memory address as described above with reference to FIG. 3.

The request count tracking module 412 may be configured to increment a request count mapped to the traced memory address in a mapping correspondence as described above with reference to FIG. 3.

The memory address filtering module 414 may be configured to perform filtering upon memory addresses of the mapping correspondences based at least in part on request counts mapped thereto as described above with reference to FIG. 3.

The memory address ordering module 416 may be configured to order memory addresses not excluded by filtering as described above with reference to FIG. 3.

The wakeup time setting module 418 may be configured to set a wakeup time based on composition of memory addresses excluded and/or not excluded by filtering as described above with reference to FIG. 3.

The cache line flushing module 420 may be configured to flush, from the cache memory, cache lines corresponding to memory addresses not excluded by filtering as described above with reference to FIG. 3.

The system 400 may additionally include an input/output ("I/O") interface 440 and a communication module 450 allowing the system 400 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.) and/or persistent memory as described above. The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), non-volatile memory ("NVM"), non-volatile random-access memory ("NVRAM"), phase-change memory ("PCM"), resistive random-access memory ("ReRAM"), magnetoresistive random-access memory ("MRAM"), non-volatile dual in-line memory modules ("NVDIMM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides selective cache flushing for persistent memory in a computing system to optimize write performance thereof. Random writes from cache memory to persistent memory are prevented from magnifying inherent phenomena of write amplification, enabling computing systems to implement persistent memory as random-access memory, at least in part. Conventional cache replacement policies may remain implemented in a computing system, but may be effectively overridden by operations of a cache line flusher according to example embodiments of the present disclosure preventing conventional cache replacement policies from being triggered. Implementations of the present disclosure may avoid becoming part of the critical path of a set of computer-executable instructions being executed by a client of cache memory, minimizing additional computation overhead in the critical path.

EXAMPLE CLAUSES

A. A method comprising: receiving, by a database, a call having a key parameter, the database comprising a data structure stored at least in part on random-access memory and at least in part on persistent memory; looking up a first element corresponding to the key by traversing an indexed data structure stored on persistent memory; and retrieving a second element mapped to the first element by a mapping correspondence stored on random-access memory.

B. The method as paragraph A recites, further comprising traversing an iterative flow implemented on a sequential database structure starting from the second element.

C. The method as paragraph B recites, wherein multiple iterative flows are traversed in parallel by multiple threads of the database.

D. The method as paragraph A recites, wherein the call further has a value parameter, and further comprising writing a delta encoding from the key and the value in persistent memory.

E. The method as paragraph D recites, further comprising prepending the delta encoding to the second element.

F. The method as paragraph E recites, further comprising compacting the delta encoding with a plurality of delta encodings of an iterative flow implemented on a sequential database structure starting from the second element.

G. The method as paragraph F recites, further comprising splitting the iterative flow into two iterative flows.

H. A system comprising: one or more processors; and memory communicatively coupled to the one or more processors, the memory storing computer-executable modules executable by the one or more processors that, when executed by the one or more processors, perform associated operations, the computer-executable modules comprising: a searching module, the searching module further comprising: a retrieval calling submodule configured to respond to a retrieval call having a key parameter made to a database; an index traversing submodule configured to look up a first element corresponding to the key by traversing an indexed data structure stored on persistent memory; and a mapping retrieving submodule configured to retrieve a second element mapped to the first element by a mapping correspondence stored on random-access memory.

I. The system as paragraph H recites, wherein the searching module further comprises a flow traversing submodule configured to traverse an iterative flow implemented on a sequential database structure starting from the second element.

J. The system as paragraph I recites, wherein multiple iterative flows are traversed in parallel by multiple threads of the database.

K. The system as paragraph H recites, further comprising an updating module, the updating module further comprising: a write calling submodule configured to respond to a write call having a key parameter and a value parameter made to a database; an index traversing submodule configured to look up a first element corresponding to the key by traversing an indexed data structure stored on persistent memory; and a mapping retrieving submodule configured to retrieve a second element mapped to the first element by a mapping correspondence stored in random-access memory; and a delta writing submodule configured to write a delta encoding from the key and the value in persistent memory.

L. The system as paragraph K recites, wherein the updating module further comprises a delta prepending submodule configured to prepend the delta encoding to the second element.

M. The system as paragraph L recites, wherein the delta writing submodule is further configured to compact the delta encoding with a plurality of delta encodings of an iterative flow implemented on a sequential database structure starting from the second element.

N. The method as paragraph M recites, further comprising a flow splitting submodule configured to split the iterative flow into two iterative flows.

O. A computer-readable storage medium storing computer-readable instructions executable by one or more processors, that when executed by the one or more processors, cause the one or more processors to perform operations comprising: receiving, by a database, a call having a key parameter, the database comprising a data structure stored at least in part on random-access memory and at least in part on persistent memory; looking up a first element corresponding to the key by traversing an indexed data structure stored on persistent memory; and retrieving a second element mapped to the first element by a mapping correspondence stored on random-access memory.

P. The computer-readable storage medium as paragraph O recites, wherein the operations further comprise traversing an iterative flow implemented on a sequential database structure starting from the second element.

Q. The computer-readable storage medium as paragraph P recites, wherein multiple iterative flows are traversed in parallel by multiple threads of the database.

R. The computer-readable storage medium as paragraph O recites, wherein the call further has a value parameter, and the operations further comprise writing a delta encoding from the key and the value in persistent memory.

S. The computer-readable storage medium as paragraph R recites, wherein the operations further comprise prepending the delta encoding to the second element.

T. The computer-readable storage medium as paragraph S recites, wherein the operations further comprise compacting the delta encoding with a plurality of delta encodings of an iterative flow implemented on a sequential database structure starting from the second element.

U. The computer-readable storage medium as paragraph T recites, wherein the operations further comprise splitting the iterative flow into two iterative flows.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   tracking write request counts mapped to write-traced memory addresses of a cache memory by replacing an existing one-to-one mapping correspondence between memory addresses and request counts with a new one-to-one mapping correspondence between memory addresses and incremented request counts;
   filtering, by a cache line flusher, traced memory addresses based at least in part on request counts mapped thereto; and
   flushing, by the cache line flusher from the cache memory, cache lines corresponding to memory addresses not excluded by filtering.

2. The method of claim 1, wherein tracking write request counts comprises incrementing a request count upon a write trace of the traced memory address being performed.

3. The method of claim 1, wherein tracking write request counts comprises batch incrementing a plurality of request counts mapped to a plurality of collected traced memory addresses.

4. The method of claim 1, wherein at least filtering traced memory addresses and flushing cache lines are performed after a thread running the cache line flusher wakes upon a wakeup time occurring.

5. The method of claim 4, further comprising setting a wakeup time based on a proportion of excluded memory addresses compared to a total number of memory addresses and/or a proportion of non-excluded memory addresses compared to a total number of memory addresses.

6. The method of claim 1, wherein filtering traced memory addresses comprises excluding memory addresses corresponding to request counts over a predetermined threshold.

7. The method of claim 1, wherein filtering traced memory addresses comprises ordering memory addresses, identifying one or more substantially contiguous ranges of memory addresses among the ordered memory addresses, and excluding memory addresses falling outside of the one or more contiguous ranges.

8. A system comprising:
   one or more processors; and
   memory communicatively coupled to the one or more processors, the memory storing computer-executable modules executable by the one or more processors that, when executed by the one or more processors, perform associated operations, the computer-executable modules comprising:
      a request count tracking module configured to track write request counts mapped to write-traced memory addresses of a cache memory by replacing an existing one-to-one mapping correspondence between memory addresses and request counts with a new one-to-one mapping correspondence between memory addresses and incremented request counts;
      a memory address filtering module configured to filter traced memory addresses based at least in part on request counts mapped thereto; and
      a cache line flushing module configured to flush from the cache memory cache lines corresponding to memory addresses not excluded by filtering.

9. The system of claim 8, wherein the request count tracking modules is configured to track write request counts by incrementing a request count upon a write trace of the traced memory address being performed.

10. The system of claim 8, wherein the request count tracking modules is configured to track write request counts by batch incrementing a plurality of request counts mapped to a plurality of collected traced memory addresses.

11. The system of claim 8, wherein at least the memory address filtering module and the cache line flushing module are configured to run in a cache line flusher thread, and configured to filter traced memory addresses and flush cache lines, respectively, after the cache line flusher thread wakes upon a wakeup time occurring.

12. The system of claim 11, further comprising a wakeup time setting module configured to set a wakeup time based on a proportion of excluded memory addresses compared to a total number of memory addresses and/or a proportion of non-excluded memory addresses compared to a total number of memory addresses.

13. The system of claim 8, wherein the memory address filtering module is configured to filter traced memory addresses by excluding memory addresses corresponding to request counts over a predetermined threshold.

14. The system of claim 8, wherein the memory address filtering module is configured to filter traced memory addresses by ordering memory addresses, identifying one or more substantially contiguous ranges of memory addresses among the ordered memory addresses, and excluding memory addresses falling outside of the one or more contiguous ranges.

15. A computer-readable storage medium storing computer-readable instructions executable by one or more processors, that when executed by the one or more processors, cause the one or more processors to perform operations comprising:
- tracking write request counts mapped to write-traced memory addresses of a cache memory by replacing an existing one-to-one mapping correspondence between memory addresses and request counts with a new one-to-one mapping correspondence between memory addresses and incremented request counts;
- filtering, by a cache line flusher, traced memory addresses based at least in part on request counts mapped thereto; and
- flushing, by the cache line flusher from the cache memory, cache lines corresponding to memory addresses not excluded by filtering.

16. The computer-readable storage medium of claim 15, wherein tracking write request counts comprises batch incrementing a plurality of request counts mapped to a plurality of collected traced memory addresses.

17. The computer-readable storage medium of claim 15, wherein at least filtering traced memory addresses and flushing cache lines are performed after a thread running the cache line flusher wakes upon a wakeup time occurring.

18. The computer-readable storage medium of claim 17, further comprising setting a wakeup time based on a proportion of excluded memory addresses compared to a total number of memory addresses and/or a proportion of non-excluded memory addresses compared to a total number of memory addresses.

19. The computer-readable storage medium of claim 15, wherein filtering traced memory addresses comprises excluding memory addresses corresponding to request counts over a predetermined threshold.

20. The computer-readable storage medium of claim 15, wherein filtering traced memory addresses comprises ordering memory addresses, identifying one or more substantially contiguous ranges of memory addresses among the ordered memory addresses, and excluding memory addresses falling outside of the one or more contiguous ranges.

\* \* \* \* \*